US008055531B2

(12) United States Patent
Beshore (10) Patent No.: US 8,055,531 B2
(45) Date of Patent: Nov. 8, 2011

(54) METHOD AND COMPUTER PROGRAM PRODUCT FOR ASSESSING A PROCESS OF AN ORGANIZATION

(75) Inventor: David G. Beshore, Newbury Park, CA (US)

(73) Assignee: The Boeing Company, Seattle, WA (US)

( * ) Notice: Subject to any disclaimer, the term of this patent is extended or adjusted under 35 U.S.C. 154(b) by 2838 days.

(21) Appl. No.: 09/848,519

(22) Filed: May 4, 2001

(65) Prior Publication Data

US 2002/0184073 A1 Dec. 5, 2002

(51) Int. Cl.
*G06Q 10/00* (2006.01)
(52) U.S. Cl. ...................................... 705/7.36
(58) Field of Classification Search ................ 705/7, 11, 705/7.36, 317
See application file for complete search history.

(56) References Cited

U.S. PATENT DOCUMENTS

| | | | |
|---|---|---|---|
| 5,587,935 A * | 12/1996 | Brooks et al. ..................... | 703/2 |
| 5,737,494 A | 4/1998 | Guinta et al. | |
| 5,893,098 A | 4/1999 | Peters et al. | |
| 5,978,648 A | 11/1999 | George et al. | |
| 5,987,149 A | 11/1999 | Poor | |
| 5,995,951 A * | 11/1999 | Ferguson .......................... | 706/10 |
| 6,092,060 A | 7/2000 | Guinta et al. | |
| 6,151,581 A | 11/2000 | Kraftson et al. | |
| 6,157,915 A | 12/2000 | Bhaskaran et al. | |
| 6,161,101 A | 12/2000 | Guinta et al. | |

OTHER PUBLICATIONS

"Evaluation Report for Grant #R13 HG00793-0142" Impact of Human Genome Initiative on Society: A Women's Study Approach. from www-unix.oit.umass.edu as accessed by web.archive.org on Feb. 2, 1999.*
Mark C. Paulk, Bill Curtis, Mary Beth Chrissis & Charles V. Weber, *Capability Maturity Model, Version 1.1*, 10 IEEE Software 18-27 (Jul. 1993), reprinted as, *The Capability Maturity Model for Software*, available at <http://www.sei.cmu.edu/cmm/papers/cmm.pdf> (visited 2001), 26 total pages.
Mark C. Paulk, *Effective CMM-Based Process Improvement*, Proceedings of the 6th Int'l Conf. on Software Quality, Ottawa, Can. 226-237 (Oct. 28-31, 1996), available at <http://www.sei.cmu.edu/cmm/papers/effective-spi.pdf> (visited 2001), 12 total pages.
Software Engineering Institute (SEI), A Systems Engineering Capability Maturity Model, Version 1.1 (1995), available at <http://www.sei.cmu.edu/pub/documents/95.reports/pfd/mm003.95.pdf>, 70 selected pages.
Electronic Industries Alliance (EIA), Systems Engineering Capability Model Appraisal Method, available at (last modified Feb. 26, 2001) <http://www.geia.org/sstc/G47/732dwnld.htm>, 161 total pages.

(Continued)

*Primary Examiner* — Johnna Loftis
(74) *Attorney, Agent, or Firm* — Alson & Bird LLP (57) ABSTRACT

A method for assessing a process of an organization is provided. First, information concerning the organization and the process is acquired, such as from a set of questionnaires, interviews and/or document reviews. Then, a plurality of preliminary findings are developed based upon the information. Each of the developed preliminary findings has an associated characterization of either a strength or a weakness. Next, a conclusion associated with each preliminary finding is voted for electronically, where the conclusion is either an agreement with the preliminary finding or a disagreement with the preliminary finding. A plurality of final findings are then developed based upon the vote for each conclusion. Each final finding also has a characterization of either a strength or a weakness.

20 Claims, 4 Drawing Sheets

OTHER PUBLICATIONS

Donna K. Dunaway & Steve Masters, CMM$^{SM}$-Based Appraisal for Internal Process Improvement (CBA IPI): Method Description (1996), available at <http://www.sei.cmu.edu/pub/documents/96.reports/pdf/tr007.96.pdf>, 57 total pages.

* cited by examiner

Systems Engineering

| Systems Engineering Toolbox | | | | | |
|---|---|---|---|---|---|
| SE Web | IPD | IPC | ReqMgmt | Synthesis | Analysis |
| V & V | Metrics | Training | Contents | Manual | Search |

Acronyms
Home
CB Training
Checklists
CMM
Contacts
Documents
Downloads
Forms
Help
Instructions
Introduction
Manuals
Metrics
Models
Order
Passwords
Process Manual
Roster
S&C Toolbox
SE Mission
SE SOPs
SE Web
Staff Dev
Standards
Templates
Tools
Workflow Table H-1 - Generic Practices Questionnaire
FA 1.1 Define Stakeholder and System Level Requirements

Appraisal Questionnaire

In the questionnaire, respondents indicate Yes, No, Not Applicable (N/A), Don't Know (D/K), or a Comment as appropriate for the practices. Respondents indicate the single most appropriate description for the Generic Attribute for each Focus Area

| Generic Practices FA 1.1 Define Stakeholder and System Level Requirements | | | | | | |
|---|---|---|---|---|---|---|
| GP | Question | Yes | No | N/A | D/K | Comments |
| GP 2.1 | Are recorded and approved plans and processes followed in implementing the Define Stakeholder and System Level Requirements Focus Area? | | | | | |
| GP 2.2 | Is compliance with approved Define Stakeholder and System Level Requirements plans and processes verified, and is appropriate action taken when performance deviates from plan or when processes are not followed? | | | | | |

Systems Engineering Capability Model (SECM) Focus Areas EIA-IS-731

| 1.1 | 1.2 | 1.3 | 1.4 | 1.5 | 1.6 | 1.7 | 2.1 | 2.2 | 2.3 | 2.4 | 2.5 | 2.6 | 2.7 | 2.8 | 3.1 | 3.2 | 3.3 | 3.4 |

**CAM*V Findings**

Program/Project: ____________
Your Name or Code: ____________

Please answer all questions to the best of your knowledge and return via E-mail using the button at the bottom of this list:

All results are confidential and protected by the assessment team. All compiled results are used by the company without assignment to individuals, teams or programs

| Number | Model Nomenclature | Finding | (S)trength (W)eakness Alternate Practice (AP) | (Y)Agree with Finding, (N) Disagree, (NOP) No Opinion | (Y) Agree with Classification: Weakness, Strength or (N) Disagree with Classification | Comment |
|---|---|---|---|---|---|---|
| 1 | RM-CO1 | Not all projects follow a written organizational policy for managing the system requirements allocated to software, through the Prime SDP | W | Y | Y | Prime does not develop a SDP |
| 2 | RM-AB3 | Not all projects have adequate resources and funding for managing the allocated requirements | W | Y | N | I consider this a strength. |
| 3 | RM-AB4 | Some On-the-Job training for requirements is not documented | W | Y | Y | |

[ Submit ]  [ Reset ]

FIG. 4

METHOD AND COMPUTER PROGRAM PRODUCT FOR ASSESSING A PROCESS OF AN ORGANIZATION

FIELD OF THE INVENTION

The present invention relates generally to methods for developing a process of an organization and, more particularly, to methods for assessing the capability of a process of an organization using a capability maturity model.

BACKGROUND OF THE INVENTION

In many industries today capability models (CMs) are used to assist organizations in developing their assets, including people, process and technology assets, to improve long-term organization performance. For example, the Software Engineering Institute (SEI) of Carnegie Mellon University and the Electronic Industries Alliance (EIA) have developed various CMs, including those for software, systems engineering and integrated product development. These CMs are typically used to assist organizations in the evolution of a process from an ad hoc, chaotic process to a mature, disciplined process. According to one CM, the Systems Engineering Capability Model (EIA-731) developed by EIA, a systems engineering process can be placed into one of five capability levels indicative of the level of development of the process. Increasing in maturity and including a default initial level, the capability levels consist of: performed, managed, defined, measured and optimizing.

To assess a process of an organization utilizing a particular CM, a sponsor typically sponsors an appraisal, or assessment, of the process, which is generally broken down into focus, best practice or process areas. Organizations typically use assessments to identify specific areas for improvement based on known, general areas of deficiency from within the process, and to help make the decisions required to effectuate change in the process and/or organization. To conduct an assessment, an assessment team typically utilizes a relevant CM in conjunction with an assessment method, such as the Systems Engineering Capability Model Appraisal Method developed by EIA.

Figure 1:
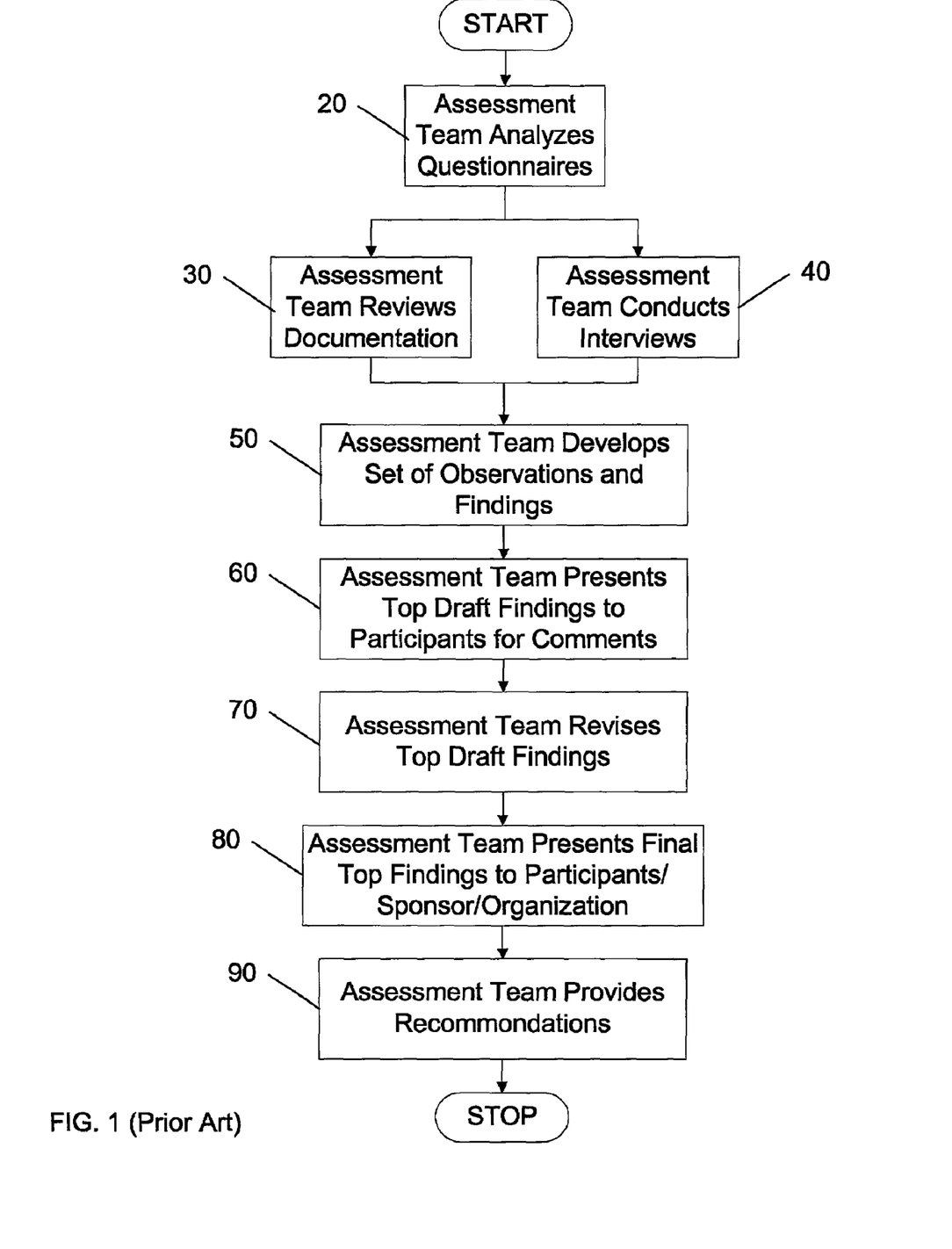
FIG. 1 is a flow chart illustrating a conventional assessment method.

Referring to FIG. 1, , conventional assessment methods generally proceed through several individual and group exercises, beginning with acquiring information about the process and the organization, and analyzing the information to develop an initial set of preliminary findings about the process, or specifically the identified focus areas within the process (blocks 20, 30, 40 and 50). The top preliminary findings are then presented to members of the organization participating in the assessment (i.e., the organization participants) for comments (block 60). Whereas the number of top preliminary findings presented can vary, the number is typically on the order of forty or more preliminary findings. From the comments, the top preliminary findings are then revised into final findings that are thereafter presented to the organization (blocks 70 and 80). After presenting the final findings, the assessment team typically presents a set of recommendations to improve the process (block 90). Whereas conventional assessment methods can provide an adequate assessment of the process of an organization, they have drawbacks. Conventional assessments are generally unpredictable due to variations in the training and experience of the organization participants and the assessment team. Typically, conventional assessments proceed through the several group exercises to arrive at a consensus with respect to developing the initial and final findings, generally with all or at least a majority agreement among members of the assessment team required for a piece of information to be made a preliminary finding, or a preliminary finding to be made a final finding. The nature of developing the final findings from difficult group exercises can further exploit the variations among organization participants and assessment teams, even though the exercises often involve checks on accuracy, corroboration, validation, and involve writing and rewriting by the assessment team and the organization participants.

Additionally, because of the difficult group exercises involved and the time required to arrive at a consensus with respect to developing the initial and final findings, conventional assessment methods can last for an unnecessarily long period of time and can result in inaccurate assessments. Conventional assessments typically require time commitments on the order of 500-1000 hours over a two or more week period, and can include group exercises that can last extended periods of time as members of the assessment team (as well as the organization participants in the case of providing comments regarding the top draft findings) discuss and re-discuss specific pieces of information and/or findings. In this regard, Table 1 illustrates a typical time frame to complete each step of a conventional assessment.

TABLE 1

| Assessment Step | Time Required to Complete |
| --- | --- |
| Fill Out Questionnaire | 1 Day |
| Analyze Questionnaire | 1 Day |
| Reviewing Documents | 2 Days |
| Conducting Interviews | 2 Days |
| Developing Draft Findings | 2 Days |
| Presenting Draft Findings | ½ Day |
| Revising Draft Findings | 1 Day |
| Presenting Final Findings | ½ Day |
| Providing Recommendations | 1 Day |
| Assessment Complete: | 11 Days |

Because of the unnecessarily long periods of time these group exercises can require, the tendency increases for members of the assessment team and/or the organization participants to halfheartedly acquiesce on particular issues of contention in an effort to end the group exercise. Such acquiescence increases the likelihood of inaccurate assessments as the agreed upon result of the issue can be inaccurate.

SUMMARY OF THE INVENTION

In light of the foregoing background, the present invention provides an improved method and computer program product for assessing a process of an organization. According to the present invention, the method and computer program product utilize an electronic voting step to reduce the amount of time spent in group exercises and the amount of time spent in drafting and presenting, for comment, an initial set of findings. The electronic voting step also makes the method and computer program product more uniform than conventional assessment methods, thus increasing the predictability of the assessment. Additionally, the electronic voting process allows the voting members to vote anonymously, thus reducing the likelihood that one vote will be influenced by another vote. In this regard, the method and computer program product of the present invention reduce the risk of inaccuracies in the assessment over conventional methods. Therefore, the method and computer program product reduce the time required to complete an assessment, reduce the unpredictability of the assessment, and reduce the inaccuracies in the assessment.

According to one embodiment of the present invention, a method for assessing a process of an organization is provided. According to this embodiment, information concerning the organization and the process is acquired, typically by an assessment team. For example, the assessment team could acquire a first set of information from a set of questionnaires and thereafter acquire a second set of information from interviews and/or document reviews. In a further embodiment, the first set of information is collated by separating the first set of information into preliminary findings and information for further review, and the second set of information is at least partially acquired based upon the information from the first set designated for further review. In this regard, the assessment team can spend less time analyzing the responses from the questionnaires because more information is initially designated as a preliminary finding, and less information requires follow up in the form of document reviews. Whereas conventional assessment methods often require time to collaborate on a single preliminary finding from multiple respective questionnaire responses, the present invention reduces the time required to analyze questionnaire responses for wording because multiple responses that have the same content, but are worded differently, can each be designated from the first set of information as a preliminary finding. Additionally, whereas conventional assessment methods only present top preliminary findings to the organization participants for comment, the present invention presents an increased number of preliminary findings to the organization participants because the electronic voting streamlines the comment process and allows more preliminary findings to be considered in less time.

After the information is acquired, a plurality of preliminary findings are developed based upon the information, such as by the assessment team, with each of the developed preliminary findings having an associated characterization of either a strength or a weakness. Next, a conclusion associated with each preliminary finding is voted for electronically, such as over a wide area network (WAN), where the conclusion is either an agreement with the preliminary finding or a disagreement with the preliminary finding. For example, a plurality of participants, including assessors and/or members of the organization, can vote anonymously over the Internet for a conclusion based upon each preliminary finding. In this regard, the vote of one participant is not influenced by the vote of any other participant, thus reducing the likelihood of half-hearted acquiescence on particular issues by those voting.

After the conclusions are voted for, a plurality of final findings are developed, such as by the assessment team, based upon the vote for each conclusion. Each final finding includes an associated characterization of either a strength or a weakness. In another embodiment, a valuation associated with each preliminary finding is also voted upon. In this embodiment, the valuation voted for is either an agreement with the characterization associated with the preliminary finding or a disagreement with the associated characterization of the preliminary finding. Also in this embodiment, the final findings are further based upon the voting for the valuation.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to one embodiment of the present invention, a method of assessing a process of an organization according to the present invention is provided. Unlike conventional assessment methods, the assessment method of the present invention utilizes an electronic voting step to vote for an initial set of preliminary findings, thus reducing the amount of time spent in group exercises and the amount of time spent in drafting and presenting, for comment, the initial set of findings. In addition, the electronic voting step makes the method of the present invention more uniform than conventional methods, thus increasing the predictability of the assessment. In this regard, two assessments of the same process, by different assessment teams, would be more likely to produce similar conclusions. Additionally, the electronic voting process allows the voting members to vote anonymously, thus reducing the likelihood that one vote will be influenced by another vote.

The assessment method can utilize any of a number of different CMs depending on the process to be assessed, such as any of the number of CMs developed by SEI and EIA for software processes, systems engineering processes and integrated product development processes. The assessment method can be divided into three phases: a preparation phase, an on-site phase and a post-appraisal phase. The preparation phase, not illustrated, prepares a sponsor of the assessment, the assessment team and units within the organization that utilize the process being assessed, as such is known. During the preparation phase, the process can be broken down into a plurality of focus areas within the process.

Figure 2:
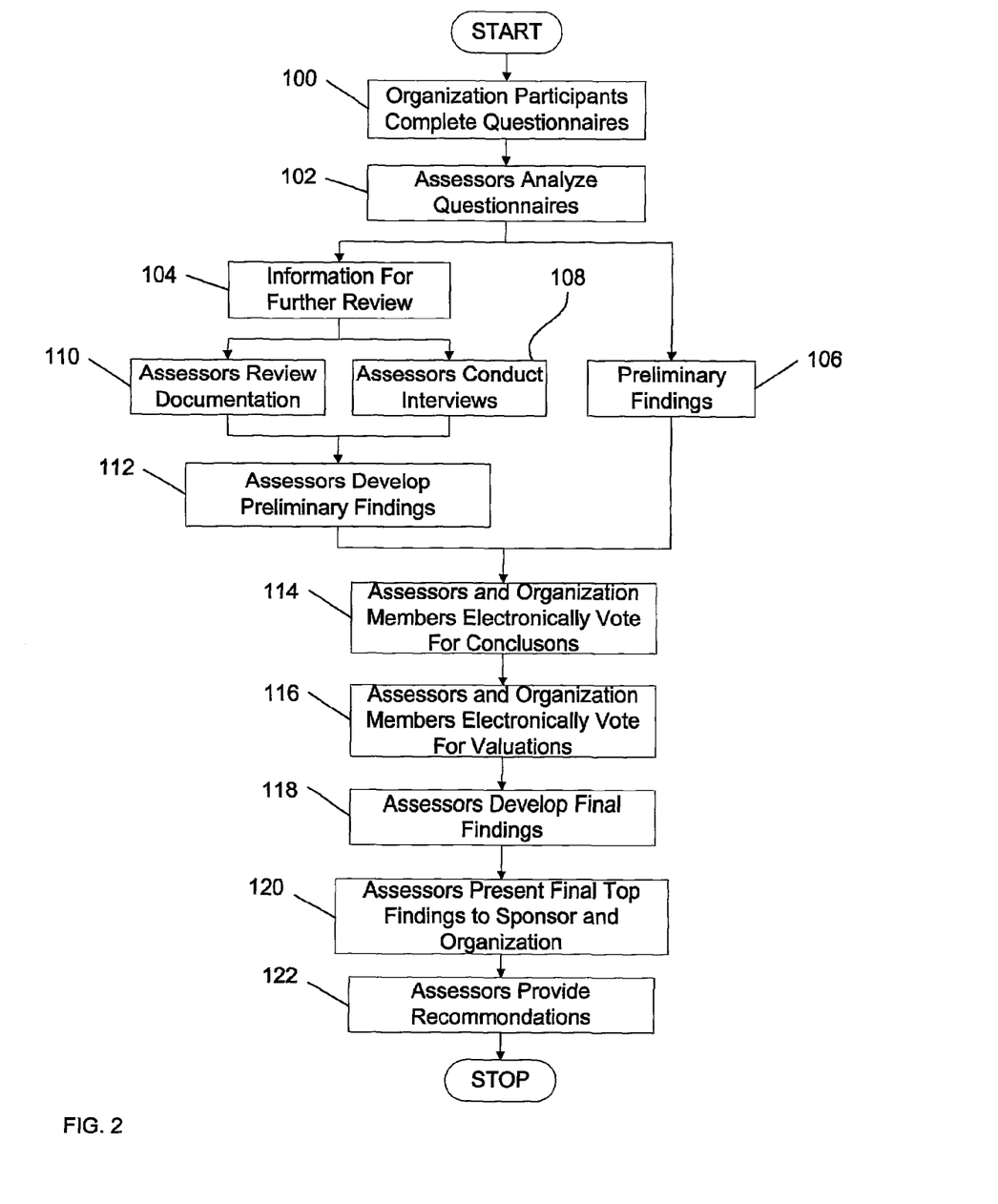
FIG. 2 is a flow chart illustrating the method of assessing a process of an organization according to one embodiment of the present invention.

Referring now to FIG. 2, also during the preparation phase, the assessment team distributes questionnaires to thereby collect questionnaire data from the organizational members participating in the assessment, typically based upon each organization participant's familiarity with each focus or process area (block 100). The organizational participants typically include managers, specialists and practitioners within the organization who are familiar with the process and/or the organization. Moreover, the questionnaires are typically derived from the CM and generally include questions relating to the process being assessed, typically broken into a set of questions for each the focus area within the process.

Figure 3:
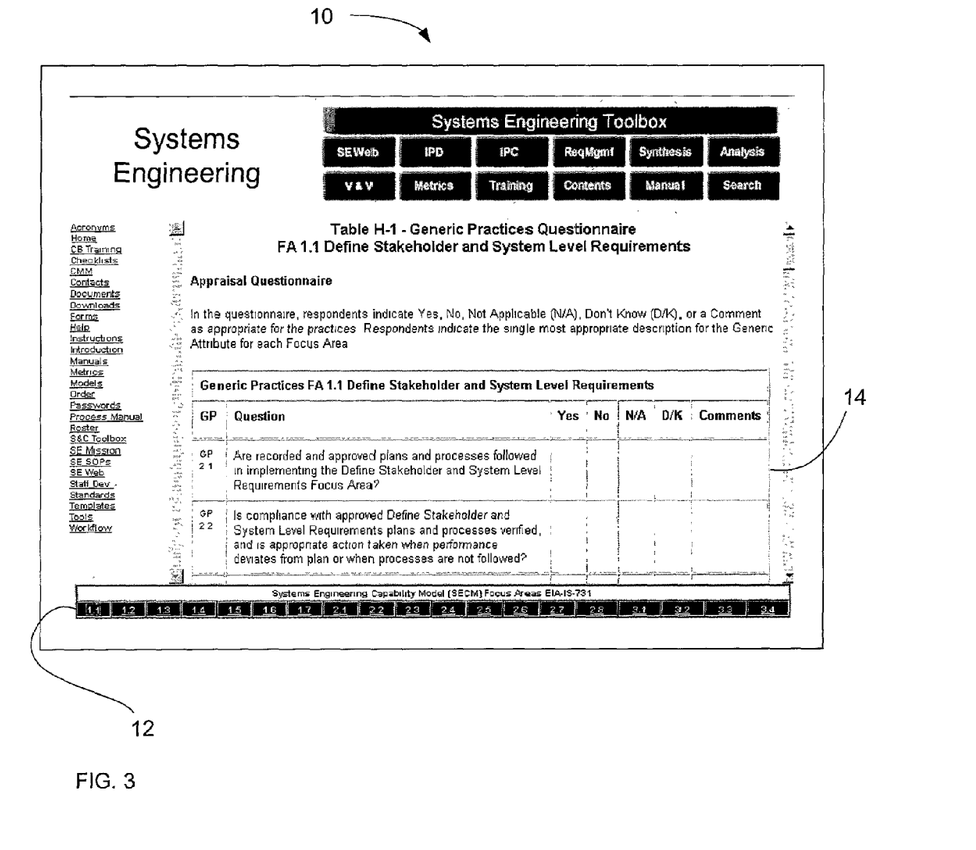
FIG. 3 is a schematic diagram illustrating an interactive electronic display for collecting questionnaire responses according to one embodiment of the present invention.

Referring to FIG. 3, to facilitate the assessment team distributing the questionnaires and receiving the responses, the questionnaires may be presented to each organization participant via an interactive electronic display 10, such as using a personal computer or other high level processor. A typical interactive display includes an electronic questionnaire broken down by focus area 12, with a plurality of questions 14 for each focus area. The questionnaires may be presented to each organization participant at a single location or at different locations, such as over the Internet. By presenting the questionnaires via the electronic display, the organization participants can electronically enter responses to the questions presented by the questionnaire and thereafter electronically transmit the responses, such as via email, to the assessment team.

As illustrated in FIG. 2, the on-site phase begins with the assessment team acquiring information (i.e., a first set of information) by consolidating the responses on the questionnaires, with the assessment team analyzing the questionnaire responses for consistency and wording (block 102). According to conventional assessment methods, the assessment team would collaborate in a group meeting to derive a conclusion with respect to all of the responses from the questionnaires. But according to the present invention, the time required to analyze the questionnaires is reduced because the assessment team spends less time discussing and re-discussing the consistency and wording of each response. In this regard, to analyze the questionnaires, the assessment team preferably collates the responses into one of two categories: information for further review and preliminary findings (blocks 104 and 106).

To collate the responses, the assessment team separates the responses into one of three areas: the responses greatly agreed upon and greatly disagreed upon by the assessment team as far as consistency and wording among the questionnaires, and the responses in between those greatly agreed upon and those greatly disagreed upon, i.e., responses "on the fence." For example, if a response is eighty percent agreed upon, it can be designated as greatly agreed upon, and if a response is eighty percent disagreed upon, it can be designated as greatly disagreed upon. Then, responses not designated as greatly agreed upon or greatly disagreed upon can be designated as "on the fence." Because the responses are analyzed with respect to wording as well as consistency, the "on-the-fence" responses can include multiple responses that have the same substantive content but varying wording.

After separating the responses into one of three areas, the responses greatly agreed upon and greatly disagreed upon are categorized as information for further review, and the responses "on the fence" are categorized as preliminary findings. The greatly agreed upon responses designated for further review will go through a process of corroboration and validation via interviews and document reviews to strengthen the validity of the responses as the responses become preliminary findings, as described below. The greatly disagreed upon responses designated for further review will go through the interviews and document reviews to resolve issues relating to the greatly disagreed upon responses so that the assessment team can come to a consensus on a preliminary finding with respect to the responses, as described below. The "on the fence" responses, which typically encompass those responses that would require the most time to discuss and re-discuss to form a consensus, will be put to the assessors a and organization participants as preliminary findings to vote for an agreement or disagreement with the findings. In this regard, those voting on the preliminary findings will determine whether the "on the fence" responses are valid findings.

After the assessment team has analyzed the questionnaires, the assessment team can acquire further information (i.e., a second set of information) by interviewing the organization participants regarding the process and/or the organization (block 108). In addition to interviewing the organization participants to acquire further information, the assessment team can use the interviews to answer any questions concerning the questionnaire responses that may have arisen as the assessment team analyzed the questionnaires. In this regard, the assessment team can resolve issues with respect to the greatly disagreed upon questionnaire responses previously designated for further review, and can corroborate and validate the greatly agreed upon questionnaire responses designated information for further review. The assessment team can also acquire further information from a review of documents of the organization relevant that are to the process and/or the organization (block 110). In a preferred embodiment, however, the assessment team uses the document reviews to resolve issues with respect to the greatly disagreed upon questionnaire responses designated for further review, and corroborate and validate the greatly agreed upon questionnaire responses designated for further review. Because the number of questionnaire responses designated for further review is reduced over conventional assessment methods, the time spent in document reviews can also be reduced over conventional assessment methods.

From the information gathered from the questionnaires, interviews and document reviews, the assessment team develops a set of preliminary findings, such as preliminary findings relating to each focus area within the process (block 112). The preliminary findings typically also include a characterization, such as a draft capability level rating, with each finding designated as a strength or a weakness. According to conventional assessment methods, the assessment team would collaborate to reduce the initial, draft set of findings into the top draft findings, numbering on the order of forty or more. But according to the present invention, the assessment team is generally permitted to develop an increased set of preliminary findings and, additionally, include the preliminary findings collated from the questionnaire responses. In this regard, the number of preliminary findings typically totals on the order of 100 to 150 or more. Because of the streamlined voting process (described below), the number of preliminary findings are increased over conventional assessment methods, which typically require time intensive group exercises to receive feedback on a reduced number of preliminary findings consisting only of the top draft findings.

After the preliminary findings are developed, they are distributed to the assessors and organization participants, typically electronically. A conclusion is then electrically voted for as to an agreement or disagreement with each of the preliminary findings (block 114). Additionally, a valuation can be voted for as to an agreement or disagreement with the characterization associated with each of the preliminary findings (block 116). According to conventional assessment methods, the organization participants would provide the assessment team with comments respecting the top draft findings, typically in focus group meetings. However, because the preliminary findings include those designated by the assessment team as they acquired the information, the assessors in the assessment team as well as the organization participants typically vote for the conclusions. Allowing the assessors to vote adds the individual conclusions of each assessor that, under conventional assessment methods, would have been added during the group exercises to develop the preliminary findings and the final findings. The voting occurs electronically, such as over a wide area network (WAN). In addition, the voting typically occurs anonymously so that the vote of one organization participant and/or assessor is not influenced by the vote of another. By voting, the assessors and organization participants can validate particular preliminary findings, including those collated from the questionnaire responses.

As stated, the voting occurs electronically and is typically anonymous. In this regard and referring to FIG. 4, the preliminary findings can be presented to the assessors and the organization members for the vote on a personal computer or other high level processor, such as via an electronic interactive display 20. By presenting the preliminary findings for the voting via an electronic display, each vote can be anonymous from the other votes, in contrast to conventional assessment methods wherein comments to the top preliminary findings are provided during group exercises. Like the electronic display of the questionnaires, the electronic display of the findings can be presented at one location wherein each voter votes at a different time. Also like the electronic display of the questionnaire, the electronic display of the findings can be, and preferably is, presented to multiple locations, such as over the Internet, so that each assessor and organization participant can vote at a different location. Advantageously, allowing each assessor and organization participant to vote from a different location further reduces the time required to vote for the conclusion and valuation.

Figure 4:
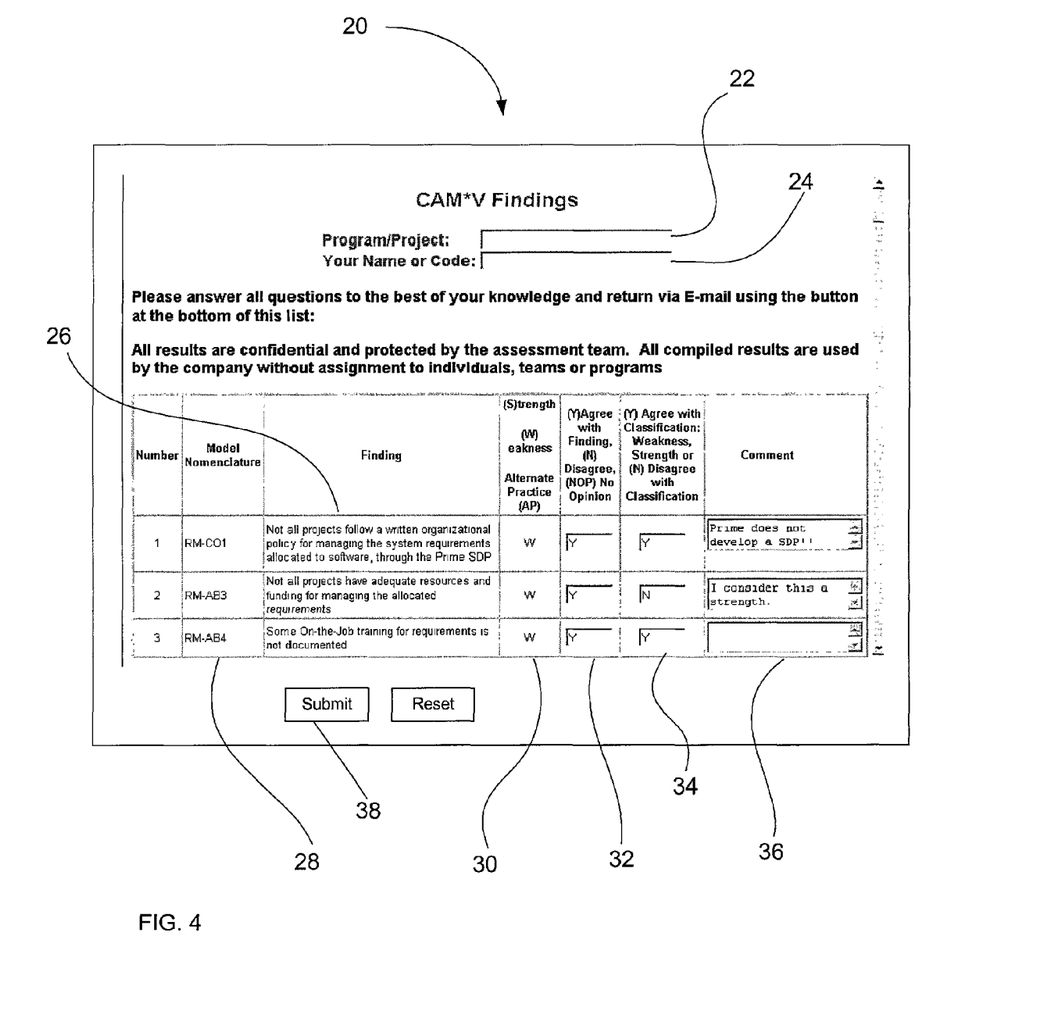
FIG. 4 is a schematic diagram illustrating an interactive electronic display for voting for a conclusion and a valuation associated with the preliminary findings according to one embodiment of the present invention.

As illustrated, the electronic display 20 of the preliminary findings for voting typically includes a process text field 22 for identifying the particular process associated with the preliminary findings, and a voter text field 24 for identifying the voter. In this regard, the conclusions each assessor and organization participant vote for can, but need not, be limited to the focus areas familiar to the respective assessor or organization participant. The electronic display also includes the preliminary findings 26 identified by focus area 28, and including a preliminary characterization 30 as either a strength or weakness.

From the electronic display 20 of the preliminary findings, the assessors and organization members can vote for the conclusion 32 to each preliminary finding by selecting whether they agree or disagree with the preliminary finding, or have no opinion. Additionally, the assessors and organization members can also preferably vote for the valuation 34 to each preliminary finding by selecting whether they agree or disagree with the characterization of the preliminary finding as a strength or a weakness. Although not illustrated, the voter can alternatively vote for the valuation by selecting that they have no opinion as to the characterization associated with particular preliminary findings, such as after the voter selected no opinion for the conclusion to a particular preliminary finding, without departing from the spirit and scope of the present invention. Also, the voter can provide comments related to particular preliminary findings via a comment text field 36 associated with each preliminary finding.

From the electronic display, after the assessor or organization participant has finished voting for the conclusions and valuations, and provided any comments, the assessor or organization can submit the responses, such as via a submit button 38 included within the electronic display. In this regard, all of the votes can be stored in a single electronic storage unit, such as an electronic memory unit associated with a personal computer or other high level processor. The votes can be stored by multiple personal computers or other high level processors, such as those from which the assessor or organization participant voted. Preferably, however, the votes are stored by a single personal computer or other high level processor, such as by transmitting the votes via email to a central electronic memory unit that stores all of the votes of all of the assessors and participants.

Referring again to FIG. 2, after the conclusions and valuations are voted upon, the assessment team develops a set of final findings based upon the conclusions (block 118). The final findings also typically include a final characterization associated with each final finding based upon the valuations. According to conventional assessment methods, after the top draft preliminary findings are presented to the organization participants for comments, the assessment team would revise the top draft findings based upon the comments and develop a set of final findings, such as in another group meeting. But because the organization participants and assessors vote for the conclusions as to the preliminary findings, the assessment team develops the set of final findings based upon the conclusion voted for with respect to each preliminary finding. In this regard, the conclusions voted for can establish the final findings and validate the final findings as accurate findings. For example, the assessment team can designate the final findings as those preliminary findings receiving a specified percentage of agreement from the voting, such as eighty percent agreement. As such, the personal computer or other high level processor that stored the votes can compile the votes to provide statistics regarding the votes, such as the percentage of agreement associated with each preliminary finding.

After developing the final findings, to conclude the on-site phase of the assessment, the assessment team presents the final findings to the sponsor, organization and/or organization participants (block 120). According to conventional assessment methods, the sponsor, organization and organization participants are typically not privy to the final findings until the assessment team presents the final findings; thus, the assessment team usually must spend time explaining the final findings to the sponsor, organization and/or organization participants. But because the final findings are at least partially directly derived from votes of the organization participants, the time required to explain the final findings is reduced, as compared to conventional assessment methods.

From the final findings, the assessment team next proceeds with the post-appraisal phase of the assessment by presenting a set of recommendations to improve the capability level of the focus or process areas within the assessed process (block 122). The recommendations are typically based upon the developed final characterization (e.g., capability level rating) of the findings within the focus areas. Additionally, the recommendations can be based upon a desired capability level rating for each focus area, typically higher than the developed final capability level rating. Like presenting the final findings, because those receiving the recommendations are at least partially directly responsible for their selection, the time required to present the recommendations is reduced, as compared to conventional assessment methods.

In one advantageous embodiment, portions of the method of the present invention, such as portions of acquiring the information, presenting a plurality of preliminary findings and voting for a conclusion and valuation, include a computer program product. The computer program product includes a computer-readable storage medium, such as the non-volatile storage medium, and computer-readable program code portions, such as a series of computer instructions, embodied in the computer-readable storage medium for receiving the information and voting for a conclusion and for subsequently presenting a plurality of developed final findings based upon the voting for the conclusion as described hereinabove. Typically, the computer program is stored by the processing element or a related memory device, such as a non-volatile storage device, and is executed by a personal computer or other high level processor.

In this regard, FIG. 2 is a block diagram, flowchart and control flow illustration of a method and the operations of a computer program products according to one advantageous embodiment of the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Therefore, the present invention provides a method and computer program product for assessing a process of an organization. The method and computer program product of the present invention utilize an electronic voting step to reduce the amount of time spent in group exercises and the amount of time spent in drafting and presenting, for comment, the initial set of findings. Table 2 illustrates a comparison of the typical amount of time required to complete an assessment according to conventional methods as compared to the method of the present invention.

TABLE 2

| Assessment Step | Required Time (Conventional Methods) | Required Time (Process with Voting) |
| --- | --- | --- |
| Fill Out Questionnaire | 1 Day | 1 Day |
| Analyze Questionnaire | 1 Day | ½ Day |
| Reviewing Documents | 2 Days | 1 Day |
| Conducting Interviews | 2 Days | 2 Days |
| Developing Draft Findings | 2 Days | ½ Day |
| Electronic Vote | N/A | ¼ Day |
| Presenting Draft Findings | ½ Day | N/A |
| Revising Draft Findings | 1 Day | N/A |
| Presenting Final Findings | ½ Day | ¼ Day |

TABLE 2-continued

| Assessment Step | Required Time (Conventional Methods) | Required Time (Process with Voting) |
| --- | --- | --- |
| Provide Recommendations | 1 Day | ¼ Day |
| Assessment Complete: | 11 Days | 5¾ Days |

As illustrated, the present invention reduces the number of group exercises and typically cuts the amount of time required to complete the assessment almost in half. The electronic voting step also increases the uniformity of the assessment, thus making the method and computer program product of the present invention more predictable than conventional methods. In addition to the time savings of the method and computer program product of the present invention, the electronic voting process allows the voting members to vote anonymously, thus reducing the likelihood that one vote will be influenced by another vote. Therefore, the method and computer program product reduce the time required to complete an assessment, reduce the unpredictability of the assessment, and reduce the inaccuracies in the assessment.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for assessing a process of an organization comprising:
    acquiring information concerning the organization and the process;
    presenting a plurality of preliminary findings developed based upon the information, each preliminary finding having been characterized and labeled with an associated characterization selected from a group consisting of a strength and a weakness;
    receiving votes for a conclusion associated with each preliminary finding, wherein the conclusion associated with each preliminary finding is selected from a group consisting of an agreement with the preliminary finding and a disagreement with the preliminary finding;
    compiling the votes to provide statistics regarding the votes; and
    presenting a plurality of final findings developed based upon the votes and statistics regarding the votes, each final finding having been characterized and labeled with an associated characterization selected from the group consisting of a strength and a weakness,
    wherein presenting the plurality of preliminary findings, receiving votes, compiling the votes and presenting the plurality of final findings are performed by execution of computer-readable program code by a processor.

2. A method according to claim 1, wherein said acquiring information comprises acquiring a first set of information from a plurality of questionnaires, and acquiring a second set of information from at least one of a plurality of interviews and at least one document review, and wherein said presenting the plurality of preliminary findings includes presenting the plurality of preliminary findings developed based upon the first set of information and the second set of information.

3. A method according to claim 2 further comprising collating the first set of information after acquiring the first set of information from the plurality of questionnaires, wherein said collating comprises identifying at least one of a preliminary finding and information for further review, and wherein said acquiring a second set of information comprises acquiring the second set of information at least partially based upon the information for further review.

4. A method according to claim 1, wherein said receiving votes comprises receiving votes of a plurality of participants, the plurality of participants having voted anonymously.

5. A method according to claim 4, wherein said receiving votes comprises receiving votes of at least one assessor and at least one member of the organization.

6. A method according to claim 1, wherein said receiving votes further comprises receiving votes for a valuation associated with each preliminary finding, wherein the valuation associated with each preliminary finding is selected from a group consisting of an agreement with the characterization of the preliminary finding and a disagreement with the associated characterization of the preliminary finding, and wherein said presenting the plurality of final findings includes presenting the plurality of final findings developed further based upon the votes for the valuation based upon the characterization associated with each preliminary finding.

7. A computer program product for assessing a process of an organization, the computer program product comprising a computer-readable storage medium having computer-readable program code portions stored therein, the computer-readable program portions comprising:
  a first executable portion for acquiring information concerning the organization and the process;
  a second executable portion for presenting a plurality of developed preliminary findings, each preliminary finding having been characterized and labeled with an associated characterization selected from a group consisting of a strength and a weakness, wherein the second executable portion is adapted to present the plurality of developed preliminary findings including associated labels, and wherein the plurality of preliminary findings are based upon the information;
  a third executable portion for voting for a conclusion associated with each preliminary finding, and wherein the conclusion associated with each preliminary finding is selected from a group consisting of an agreement with the preliminary finding and a disagreement with the preliminary finding; and
  a fourth executable portion for presenting a plurality of developed final findings, each final finding having been characterized and labeled with an associated characterization selected from the group consisting of a strength and a weakness, wherein the fourth executable portion is adapted to present the plurality of developed final findings including associated labels, and wherein the plurality of final findings are based upon the voting for the conclusion associated with each preliminary finding.

8. A computer program product according to claim 7, wherein said first executable portion is adapted to acquire a first set of information from a plurality of questionnaires, and a second set of information from at least one of a plurality of interviews and at least one document review, and wherein said second executable portion is adapted to present a plurality of developed preliminary findings based upon the first set of information and the second set of information.

9. A computer program product according to claim 8, wherein said first executable portion is further adapted to collate the first set of information after acquiring the first set of information from the plurality of questionnaires, wherein said first executable portion collates the first set of information by identifying at least one of a preliminary finding and information for further review, and wherein said first executable portion is adapted to acquire the second set of information at least partially based upon the information for further review.

10. A computer program product according to claim 7, wherein said third executable portion is adapted for a plurality of participants to vote for a conclusion based upon each preliminary finding such that the vote of each participant is anonymous.

11. A computer program product according to claim 10, wherein said third executable portion is adapted for at least one assessor and at least one member of the organization to vote for the conclusion.

12. A computer program product according to claim 7, wherein said third executable portion is further adapted to vote for a valuation associated with each preliminary finding, wherein the valuation of each preliminary finding is selected from a group consisting of an agreement with the associated characterization of the preliminary finding and a disagreement with the associated characterization of the preliminary finding, and wherein the plurality of final findings further are further based upon the voting for the valuation based upon the associated characterization of each preliminary finding.

13. A computer program product according to claim 7, wherein said first executable portion is adapted to at least partially acquire information via a wide area network (WAN), wherein said second executable portion is adapted to present the plurality of developed preliminary findings via the WAN, and wherein said third executable portion is adapted for voting via the WAN.

14. A computer program product according to claim 13, wherein the WAN comprises the Internet.

15. A method for developing at least one assessment of a process of an organization, wherein each of the at least one assessments is labeled with an associated characterization selected from a group consisting of a strength and a weakness, said method comprising:
  acquiring information concerning the organization and the process;
  presenting a plurality of preliminary findings developed based upon the information, each preliminary finding having been characterized and labeled with an associated characterization;
  receiving votes for a valuation associated with each preliminary finding, wherein the valuation is selected from a group consisting of an agreement with the characterization of the preliminary finding and a disagreement with the characterization of the preliminary finding;
  compiling the votes to provide statistics regarding the votes; and
  presenting at least one assessment developed based upon the votes and statistics regarding the votes, each assessment having been characterized and labeled with an associated characterization, and wherein the associated characterization of each assessment is based upon said voting for the valuation associated with each preliminary finding,
  wherein presenting the plurality of preliminary findings, receiving votes, compiling the votes and presenting the at least one assessment are performed by execution of computer-readable program code by a processor.

16. A method according to claim 15, wherein said acquiring information comprises acquiring a first set of information from a plurality of questionnaires, and acquiring a second set of information from at least one of a group consisting of a plurality of interviews and at least one document review, and wherein said presenting the plurality of preliminary findings includes presenting the plurality of preliminary findings developed based upon the first set of information and the second set of information.

17. A method according to claim 16 further comprising collating the first set of information after acquiring the first set of information from the plurality of questionnaires, wherein said collating comprises identifying at least one of a preliminary finding and information for further review, and wherein said acquiring a second set of information comprises acquiring the second set of information at least partially based upon the information for further review.

18. A method according to claim 15, wherein said receiving votes comprises receiving votes of a plurality of participants, the plurality of participants having voted anonymously.

19. A method according to claim 18, wherein said receiving votes comprises receiving votes of at least one assessor and at least one member of the organization.

20. A method according to claim 15, wherein said receiving votes further comprises receiving votes for a conclusion associated each preliminary finding, wherein the conclusion of each preliminary finding is selected from a group consisting of an agreement with the preliminary finding and a disagreement with the preliminary finding, and wherein said presenting the at least one assessment includes presenting the at least one assessment developed further based upon the votes for the conclusion associated with each preliminary finding.

* * * * *